United States Patent
Tseng

(10) Patent No.: US 12,436,805 B2
(45) Date of Patent: Oct. 7, 2025

(54) COMPUTER SYSTEM WITH PROCESSING CIRCUIT THAT WRITES DATA TO BE PROCESSED BY PROGRAM CODE EXECUTED ON PROCESSOR INTO EMBEDDED MEMORY INSIDE PROCESSOR

(71) Applicant: VIA Technologies Inc., New Taipei (TW)

(72) Inventor: Chun-Hua Tseng, New Taipei (TW)

(73) Assignee: VIA Technologies Inc., New Taipei (TW)

( * ) Notice: Subject to any disclaimer, the term of this patent is extended or adjusted under 35 U.S.C. 154(b) by 576 days.

(21) Appl. No.: 17/349,937

(22) Filed: Jun. 17, 2021

(65) Prior Publication Data
US 2022/0269544 A1    Aug. 25, 2022

(30) Foreign Application Priority Data
Feb. 25, 2021    (TW) .................... 110106722

(51) Int. Cl.
*G06F 9/50* (2006.01)
*G06F 9/30* (2018.01)

(52) U.S. Cl.
CPC ........ *G06F 9/5016* (2013.01); *G06F 9/30043* (2013.01); *G06F 9/30098* (2013.01); *G06F 9/5044* (2013.01)

(58) Field of Classification Search
None
See application file for complete search history.

(56) References Cited

U.S. PATENT DOCUMENTS

| | | | | |
|---|---|---|---|---|
| 5,592,476 A | * | 1/1997 | Calamvokis | H04L 12/1881 370/413 |
| 6,357,015 B1 | * | 3/2002 | Yamakawa | G06F 13/4217 713/600 |
| 7,791,611 B1 | * | 9/2010 | Holmqvist | G06T 1/60 345/545 |
| 2005/0154805 A1 | * | 7/2005 | Steely | G06F 9/30181 712/E9.046 |
| 2005/0183093 A1 | * | 8/2005 | Pope | G06F 13/24 719/314 |

(Continued)

FOREIGN PATENT DOCUMENTS

| | | |
|---|---|---|
| CN | 101395578 | 3/2009 |
| CN | 103150269 | 6/2013 |

(Continued)

OTHER PUBLICATIONS

He Xiaoyu, "Low Power Design Technology of Embedded Memory", Microprocessors, No. 4, Aug. 2016, pp. 23~26, China, Aug. 2016.

(Continued)

*Primary Examiner* — Aimee Li
*Assistant Examiner* — Zujia Xu
(74) *Attorney, Agent, or Firm* — Winston Hsu

(57) ABSTRACT

A computer system includes a processor and a processing circuit. The processor has an embedded memory. The processing circuit is arranged to perform a write operation for writing a first write data into the embedded memory included in the processor. The processor is arranged to load and execute a program code to perform a read operation for reading the first write data from the embedded memory included in the processor.

4 Claims, 7 Drawing Sheets

(56) References Cited

U.S. PATENT DOCUMENTS

| | | |
|---|---|---|
| 2008/0072031 A1 | 3/2008 | Choi |
| 2009/0106499 A1* | 4/2009 | Aoki ................... G06F 12/126 |
| | | 711/137 |
| 2014/0089568 A1 | 3/2014 | Chung |
| 2015/0046658 A1* | 2/2015 | Wilson ............... G06F 12/0895 |
| | | 711/135 |
| 2018/0151218 A1* | 5/2018 | Yun ..................... G06F 3/0659 |
| 2019/0095345 A1 | 3/2019 | Zmudzinski |
| 2019/0251038 A1 | 8/2019 | Kang |
| 2020/0110671 A1* | 4/2020 | Woo ................... G06F 11/1666 |
| 2021/0149599 A1* | 5/2021 | Kajihara ............. G06F 12/0871 |
| 2022/0058132 A1* | 2/2022 | Roberts .............. G06F 12/0862 |

FOREIGN PATENT DOCUMENTS

| | | |
|---|---|---|
| CN | 103959652 | 7/2014 |
| CN | 109842609 | 6/2019 |
| TW | 201941159 A | 10/2019 |

OTHER PUBLICATIONS

Office action mailed/issued on Apr. 10, 2025 for CN application No. 202110318987.1, filing date: Mar. 25, 2021, pp. 1~8, Apr. 10, 2025.

* cited by examiner

COMPUTER SYSTEM WITH PROCESSING CIRCUIT THAT WRITES DATA TO BE PROCESSED BY PROGRAM CODE EXECUTED ON PROCESSOR INTO EMBEDDED MEMORY INSIDE PROCESSOR

BACKGROUND OF THE INVENTION

1. Field of the Invention

The present invention is related to data processing, and more particularly, to a computer system with a processing circuit (e.g. pure hardware circuit or another processor) that may directly write data to be processed by a program code executed on a processor into an embedded memory inside the processor.

2. Description of the Prior Art

Generally speaking, a processor may simply read a register of external hardware through a polling mechanism, to check the status of the external hardware. However, compared with a write operation, a read operation is more time-consuming. As a result, the read operation of the processor for reading information from the register of the external hardware often takes a lot of clock cycles to complete. For a computer system, frequent read operations of the processor for reading the register of the external hardware seriously affect system performance.

SUMMARY OF THE INVENTION

It is therefore an objective of the present invention to provide a computer system with a processing circuit (e.g. pure hardware circuit or another processor) that may directly write data to be processed by a program code executed on a processor into an embedded memory inside the processor.

In an embodiment of the present invention, a computer system is provided. The computer system includes a processor and a processing circuit. The processor includes an embedded memory. The processing circuit is arranged to perform a write operation to write a first write data into the embedded memory included in the processor. The processor is arranged to load and execute a program code, to perform a read operation for reading the first write data from the embedded memory included in the processor.

Compared with reading the required data from the external circuit by the processor itself that consumes a lot of clock cycles, reading the required data from the internal embedded memory by the processor may greatly shorten the read time, and may improve overall performance of the computer system.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
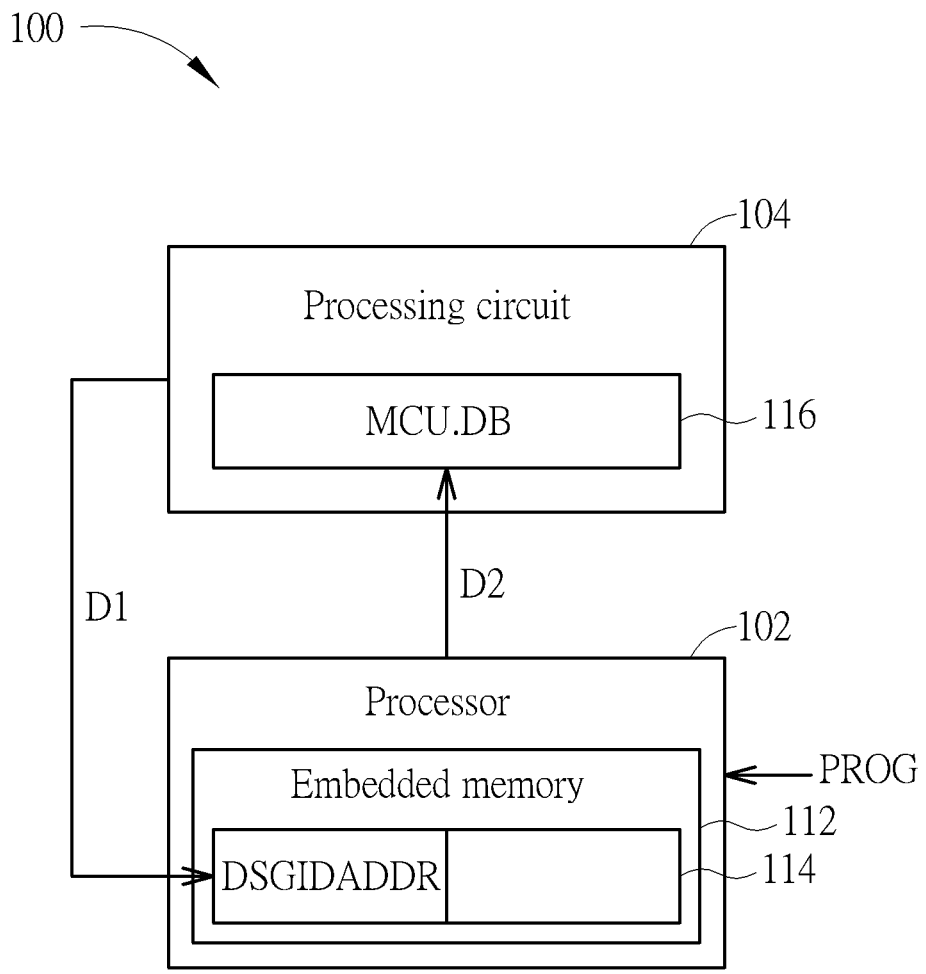
FIG. 1 is a diagram illustrating a computer system according to an embodiment of the present invention.

FIG. 1 is a diagram illustrating a computer system according to an embodiment of the present invention. The computer system 100 includes a processor 102 and a processing circuit 104, wherein the processor 102 may load and execute a program code PROG (e.g. application program or firmware), and the processing circuit 104 is pure hardware (i.e. the processing circuit 104 has no need to realize its designated functions by executing the software). Please note that, for brevity, FIG. 1 only illustrates a single processor and a single processing circuit. However, the present invention is not limited thereto. In practice, the computer system 100 may include a plurality of processors 102 and/or a plurality of processing circuits 104. In addition, the processing circuit 104 may be any hardware circuit that can work with the processor 102. For example, the processing circuit 104 may be a solid-state drive (SSD) control circuit.

As shown in FIG. 1, the processor 102 includes an embedded memory 112 (e.g. cache or tightly-coupled memory (TCM)). The embedded memory 112 has a storage space 114 addressed by a memory address DSGIDADDR. In addition, the processing circuit 104 has a register 106 (labeled as MCU.DB in FIG. 1), such as a doorbell register. In this embodiment, the processing circuit 104 is arranged to perform a write operation to write a data D1 into the embedded memory 112 (e.g. the storage space 114 addressed by the memory address DSGIDADDR) in the processor 102. The processor 102 is arranged to load and execute the program code PROG, to perform a read operation for reading the data D1 written by the processing circuit 104 from the embedded memory 112 (e.g. the storage space 114 addressed by the memory address DSGIDADDR) inside the processor 102. Generally speaking, the execution time required for the write operation is much less than the execution time required for the read operation. Compared with reading the data D1 from the processing circuit 104 by the processor 102 itself that consumes a lot of clock cycles, reading the data D1 from the internal embedded memory 112 by the processor 102 may greatly shorten the read time, and may improve overall performance of the computer system 100.

Figure 2:
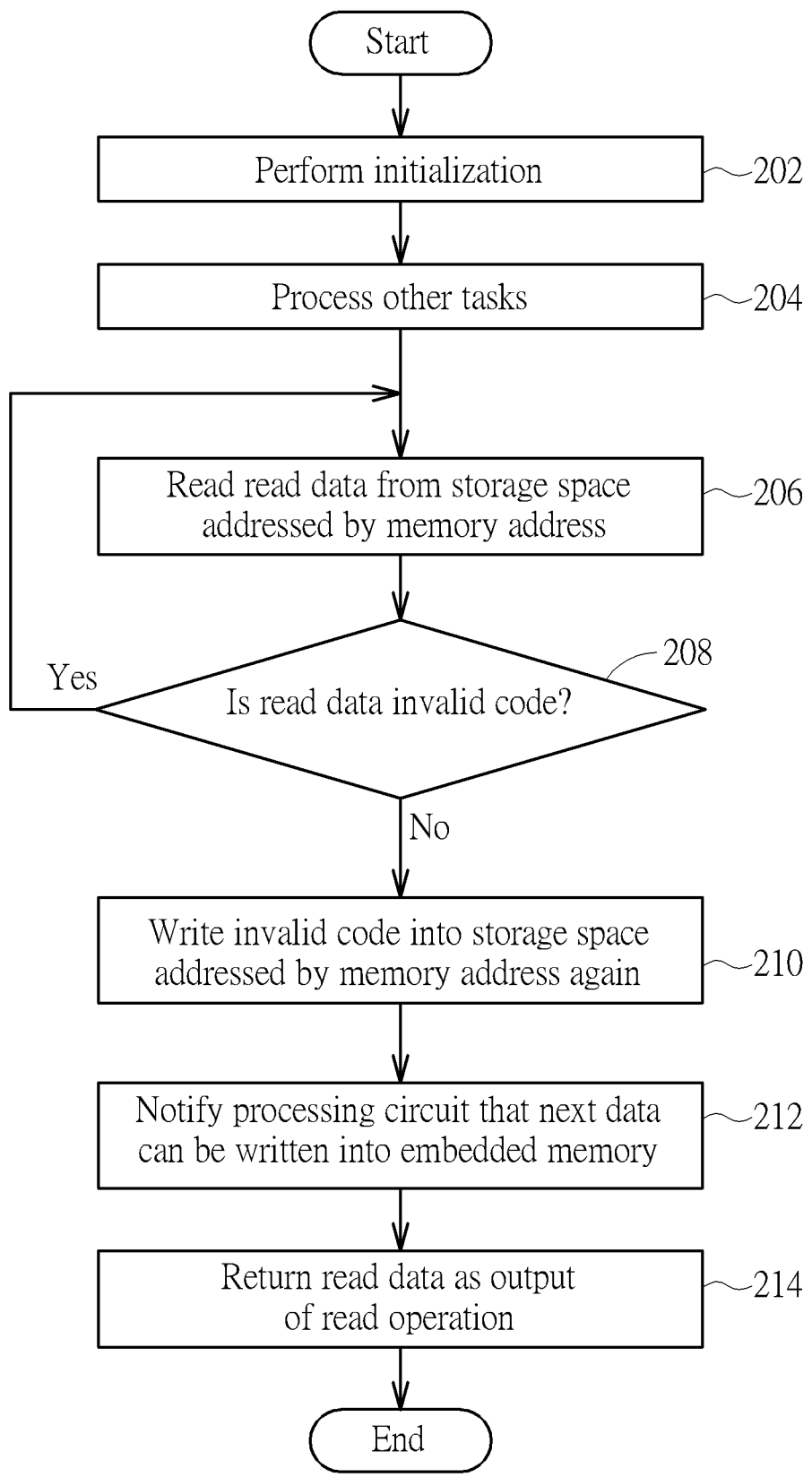
FIG. 2 is a flow chart of reading data from an embedded memory by a processor shown in FIG. 1 according to an embodiment of the present invention.

FIG. 2 is a flow chart of reading data from an embedded memory by the processor shown in FIG. 1 according to an embodiment of the present invention. Provided that the result is substantially the same, the steps are not required to be executed in the exact order shown in FIG. 2. In addition, other steps may be added to the flow shown in FIG. 2. The flow shown in FIG. 2 may be realized by executing the program code PROG by the processor 102. In Step 202, the processor 102 performs an initialization operation on the register 116 in the processing circuit 104 and the storage space 114 addressed by the memory address DSGIDADDR in the embedded memory 112. For example, an invalid code INVALID_8F may be written into the register 116 and the storage space 114, respectively. This initialization operation may be expressed by the following pseudo code.

```
void    HAL_DSGInit( )
{
write(DSGIDADDR, INVALID_8F);
write(MCU.DB, INVALID_8F);
}
```

In this embodiment, the register 116 is used as a doorbell register. As a result, after the processor 102 executes the program code PROG to write the predetermined data (e.g. invalid code INVALID_8F) into the register 116, the processor 102 notifies the processing circuit 104 through the register 116 that the data D1 can be written into the embedded memory 112. During the process of the processing circuit 104 preparing the data D1 for the write operation, the processor 102 may execute the program code PROG to process other tasks (Step 204). In this way, the time for the processor 102 to wait for the processing circuit 104 to complete the write operation may be reduced, and the performance of the computer system 100 may be further improved. However, the present invention is not limited thereto. In another embodiment, the flow shown in FIG. 2 may omit Step 204.

In Step 206, the processor 102 reads a read data DSGIDAddr from the storage space 114 addressed by the memory address DSGIDADDR. In Step 208, the processor 102 compares the invalid code INVALID_8F and the read data DSGIDAddr obtained by Step 206 to generate a comparison result. Since the processing circuit 104 has been notified by the register 116 that the data D1 can be written into the embedded memory 112 (Step 202), if the processing circuit 104 has completed the write operation in the period between Step 202 and Step 206 to write the data D1 into the storage space 114 addressed by the memory address DSGIDADDR in the embedded memory 112, the data D1 overwrites the original invalid code INVALID_8F. In this way, the read data DSGIDAddr obtained by Step 206 is not the invalid code INVALID_8F. As a result, Step 210 is entered. On the contrary, if the processing circuit 104 has not completed the write operation of the data D1 in the period between Step 202 and Step 206, the invalid code INVALID_8F is still stored in the storage space 114 addressed by the memory address DSGIDADDR in the embedded memory 112. In this way, the read data DSGIDAddr obtained by Step 206 is still the invalid code INVALID_8F. As a result, Step 206 is returned to reread the storage space 114 addressed by the memory address DSGIDADDR until the processing circuit 104 completes the write operation of the data D1 to overwrite the original invalid code INVALID_8F in the storage space 114 (i.e. the processor 102 repeats Steps 206 and 208 to wait for the processing circuit 104 to complete the write operation of the data D1).

Since the required read data DSGIDAddr (DSGIDAddr=D1) has been read successfully (Step 206), the processor 102 writes the invalid code INVALID_8F into the storage space 114 addressed by the memory address DSGIDADDR in the embedded memory 112 (Step 210) again, to subsequently determine whether the processing circuit 104 has written the next data into the embedded memory 112 (e.g. the storage space 114 addressed by the memory address DSGIDADDR) through Steps 206 and 208 again. In Step 212, the processor 102 further writes the predetermined data (e.g. read data DSGIDAddr) back to the register 116, to notify the processing circuit 104 through the register 116 that the next data can be written into the embedded memory 112 (Step 212). In Step 214, the processor 102 finally returns the read data DSGIDAddr (DSGIDAddr=D1) as an output of the read operation.

The above-mentioned read operation may be expressed by the following pseudo code.

```
U32HAL_GetDSG( )
{
U32DSGIDAddr;
while(DSGIDAddr = read(DSGIDADDR) = INVALID_8F);
write(DSGIDADDR, INVALID_8F);
write(MCU.DB, DSGIDAddr);
return DSGIDAddr;
}
```

Figure 3:
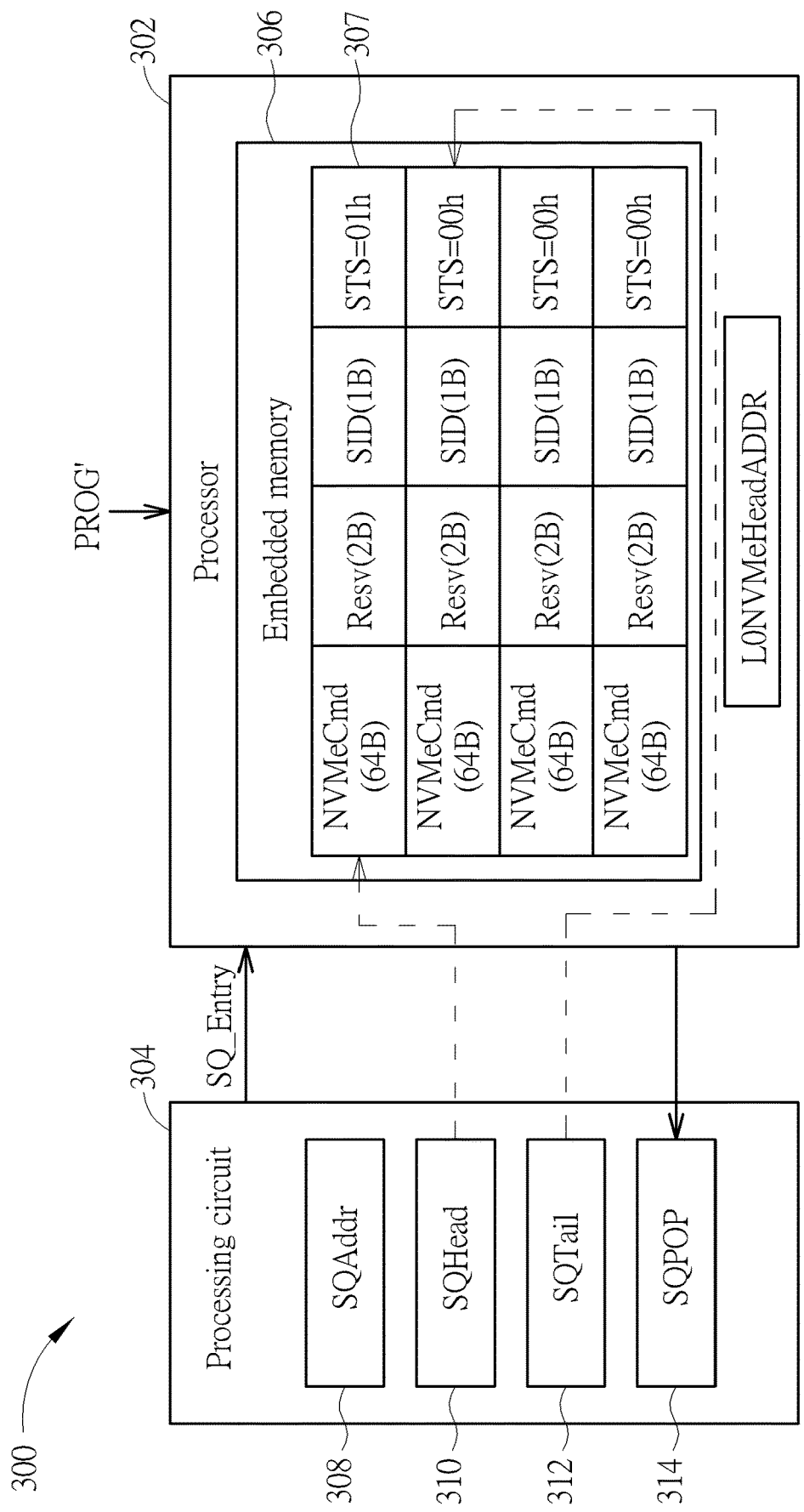
FIG. 3 is a diagram illustrating a computer system according to another embodiment of the present invention.

FIG. 3 is a diagram illustrating a computer system according to another embodiment of the present invention. A computer system 300 includes a processor 302 and a processing circuit 304, wherein the processor 302 may load and execute a program code PROG' (e.g. application program or firmware), and the processing circuit 304 is pure hardware (i.e. the processing circuit 304 has no need to realize its designated functions by executing the software). Please note that, for brevity, FIG. 3 only illustrates a single processor and a single processing circuit. However, the present invention is not limited thereto. In practice, the computer system 300 may include a plurality of processors 302 and/or a plurality of processing circuits 304. In addition, the processing circuit 304 maybe any hardware circuit that can work with the processor 302. For example, the processing circuit 304 may be an SSD control circuit.

As shown in FIG. 3, the processor 302 includes an embedded memory 306, such as a cache or a TCM. In addition, the embedded memory 306 stores a queue 307, such as a submission queue (SQ) of non-volatile memory express (NVMe). The processing circuit 304 has a plurality of registers 308, 310, 312, and 314 (labeled as SQAddr, SQHead, SQTail, and SQPOP in FIG. 3, respectively). The register 308 is arranged to record a base address of the queue 307 stored in the embedded memory 306. The register 310 is arranged to record an index value of a queue head of the queue 307. The register 312 is arranged to record an index value of a queue tail of the queue 307. In this embodiment, each entry of the queue 307 records an NVMe command (NVMeCmd), a reserved field (Resv), an identifier (SID), and a data validity status value (STS). When the processor 302 executes the program code PROG' to read an entry from the queue 307, data is additionally written into the register 314 to notify that the entry has been read, and the data validity status value recorded by the entry is cleared as 00h (i.e. STS=STS_FREE=00h). In addition, the processing circuit 304 adds 1 to the index value of the queue head recorded in the register 310 in response to the notification of the register 314. When the processing circuit 304 writes the data into an entry in the queue 307, the data validity status value recorded by the entry is updated as 01h (i.e. STS=STS_PENDING=01h), and 1 is added to the index value of the queue tail recorded in the register 312. The relevant details will be detailed later.

In this embodiment, the processing circuit 304 is arranged to perform a write operation to write a queue data SQ_Entry into the embedded memory 306 in the processor 302. The processor 302 is arranged to load and execute the program code PROG', for performing a read operation to read the queue data SQ_Entry written by the processing circuit 304 from the embedded memory 306 in the processor 302.

Generally speaking, the execution time required for the write operation is much less than the execution time required for the read operation. Compared with reading the queue data SQ_Entry from the processing circuit 304 by the processor 302 itself that consumes a lot of clock cycles, reading the queue data SQ_Entry from the internal embedded memory 306 by the processor 302 may greatly shorten the read time, and may improve overall performance of the computer system 300.

Figure 4:
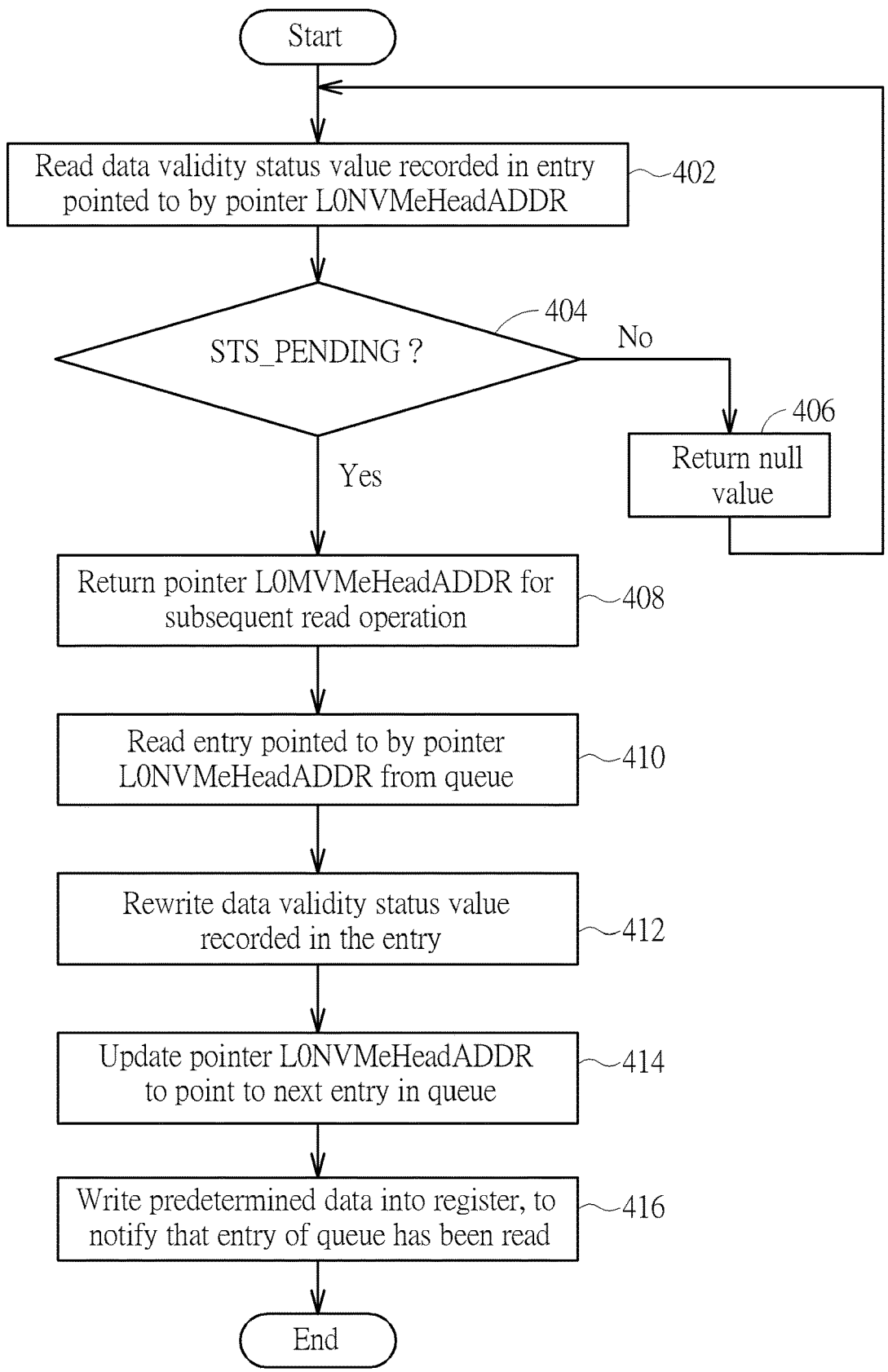
FIG. 4 is a flow chart of reading data from an embedded memory by a processor shown in FIG. 3 according to an embodiment of the present invention.

In this embodiment, the processor 302 executes the program code PROG' to record and maintain a pointer L0NVMeHeadADDR in the processor 302, and refers to the pointer L0NVMeHeadADDR for reading each entry of the queue 307 stored in the embedded memory 306, respectively. FIG. 4 is a flow chart of reading data from an embedded memory by the processor shown in FIG. 3 according to an embodiment of the present invention. Provided that the result is substantially the same, the steps are not required to be executed in the exact order shown in FIG. 4. In addition, other steps may be added to the flow shown in FIG. 4. The flow shown in FIG. 4 may be realized by executing the program code PROG' by the processor 302. In Step 402, the processor 302 reads a data validity status value STS recorded in the entry pointed to by the pointer L0NVMeHeadADDR. In this embodiment, the function of the pointer L0NVMeHeadADDR is similar to the index value of the queue head recorded by the register 310. In Step 404, according to the data validity status value STS, the processor 302 determines whether to return the pointer L0NVMeHeadADDR for the subsequent read operation. For example, the processor 302 determines whether the data validity status value STS is 01h (STS_PENDING). If the data validity status value STS is 00h (STS_FREE), it represents that the queue 307 is currently an empty queue. As a result, Step 406 is entered to return a null value (NULL), and Steps 402 and 404 are repeated to wait for the processing circuit 304 to write the queue data SQ_Entry into the queue 307. On the contrary, if the data validity status value STS is 01h (STS_PENDING), it represents that the queue 307 currently has valid entries to be processed. As a result, Step 408 is entered to return the pointer L0NVMeHeadADDR for subsequent read operation.

The above-mentioned operation may be expressed by the following pseudo code.

```
PNVMeCMD    HAL_L0GetNVMeCmd( )
{
if (L0NVMeHeadADDR->Status == STS_PENDING)
return L0NVMeHeadADDR;
else
return NULL;
}
```

In Step 410, the processor 302 reads an entry pointed to by the pointer L0NVMeHeadADDR from the queue 307 according to the pointer L0NVMeHeadADDR returned by Step 408, to obtain the NVMe command recorded in the entry. Since the entry pointed to by the pointer L0NVMeHeadADDR has been read, in Step 412, the processor 302 rewrites the data validity status value recorded in the entry as 00h (STS_FREE). In addition, in Step 414, the processor 302 updates the pointer L0NVMeHeadADDR to point to the next entry (L0NVMeHeadADDR=L0NVMeHeadADDR+1) in the queue 307. It is assumed that the queue 307 is realized by data structure of the circular queue, and the number of the entries included in the queue 307 is NVMECMDQD (NVMECMDQD=4 in this embodiment). As a result, L0NVMeHeadADDR+1 is further processed by a modulus operation according to NVMECMDQD, to determine the updated value of the pointer L0NVMeHeadADDR. As mentioned before, the processing circuit 302 records the index value of the queue head of the queue 307 by the register 310, and adds 1 to the index value of the queue head recorded in the register 310 in response to the notification of the register 314. After the entry pointed to by the pointer L0NVMeHeadADDR has been read (Step 410), the processor 302 writes the predetermined data (e.g. 1) into the register 314, to notify that the entry of the queue 307 has been read (Step 416).

The above-mentioned operation may be expressed by the following pseudo code.

```
void    HAL_L0PopNVMeCmdNode( )
{
L0NVMeHeadADDR->status = STS_FREE;
L0NVMeHeadADDR = (L0NVMeHeadADDR+1) % NVMECMDQD;
write(SQPOP, 1);
}
```

Figure 5:
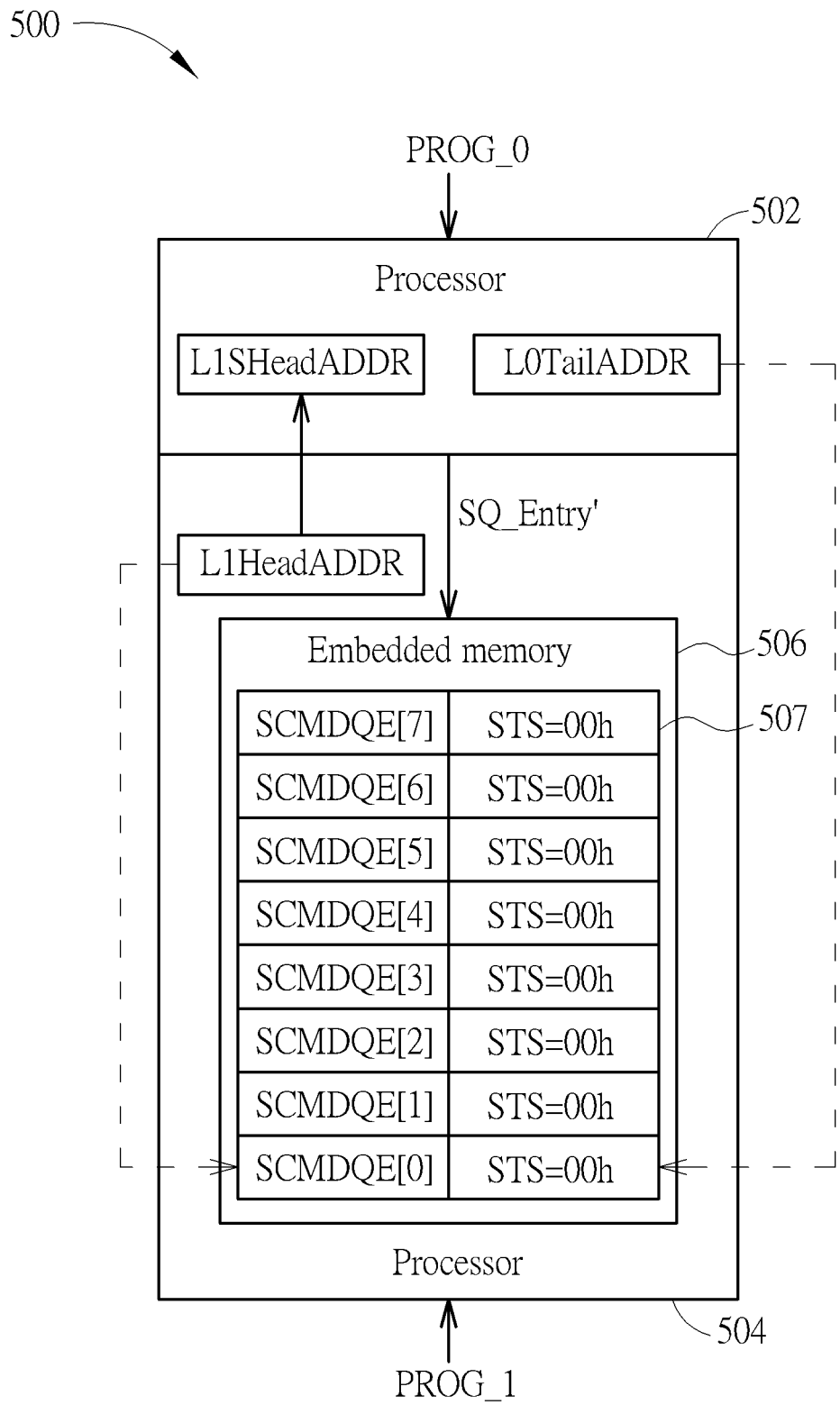
FIG. 5 is a diagram illustrating a computer system according to still another embodiment of the present invention.

FIG. 5 is a diagram illustrating a computer system according to another embodiment of the present invention. A computer system 500 includes a plurality of processors 502 and 504, wherein the processor 502 may load and execute a program code PROG_0 (e.g. application program or firmware), and the processor 504 may load and execute a program code PROG_1 (e.g. application program or firmware). For example, the computer system 500 may adopt asymmetric multi-processor computation architecture. Compared with the processing circuit 104 shown in FIG. 1 and the processing circuit 304 shown in FIG. 3, the processor 502 in this embodiment realizes the function of the processing circuit by executing the software. Please note that, for brevity, FIG. 5 only illustrates 2 processors. However, the present invention is not limited thereto. In practice, the computer system 500 may include more than 2 processors.

As shown in FIG. 5, the processor 504 includes an embedded memory 506 such as a cache or a TCM. In addition, the embedded memory 506 stores a queue 507. In this embodiment, the processor 502 loads and executes the program code PROG_0 to perform a write operation, to write a queue data SQ_Entry' into the embedded memory 506 in the processor 504. The processor 504 loads and executes another program code PROG_1 to perform a read operation, to read the queue data SQ_Entry' written by another processor 502 from the embedded memory 506 inside the processor 504. Generally speaking, the execution time required for the write operation is much less than the execution time required for the read operation. Compared with reading the queue data SQ_Entry' from the external circuit by the processor 504 itself that consumes a lot of clock cycles, reading the queue data SQ_Entry' from the internal embedded memory 506 by the processor 502 may greatly shorten the read time, and may improve overall performance of the computer system 500.

In this embodiment, the processor 502 executes the program code PROG_0 to record and maintain a pointer L0TailADDR in the processor 502, and writes a plurality of queue data SQ_Entry' into a plurality of entries of the queue 507 stored in the embedded memory 506 according to the pointer L0TailADDR, respectively. In addition, the processor 504 executes the program code PROG_1 to record and maintain a pointer L1HeadADDR in the processor 504, and reads each entry of the queue 507 stored in the embedded memory 506 according to the pointer L1HeadADDR. The processor 504 further executes the program code PROG_1 to duplicate and write the pointer L1HeadADDR into the processor 502 as a pointer L1SHeadADDR (i.e. L1SHeadADDR=L1HeadADD) that may be quickly read by the processor 502. Generally speaking, the execution time required for the write operation is much less than the execution time required for the read operation. Compared with reading the pointer L1HeadADDR from the processor 504 by the processor 502 that consumes a lot of clock cycles, reading the pointer L1SHeadADDR from the interior by the processor 502 may save a lot of time.

As shown in FIG. 5, there are two pointers L0TailADDR and L1SHeadADDR (L1SHeadADDR=L1HeadADDR) inside the processor 502. As a result, when the processor 502 executes the program code PROG_0, the two pointers L0TailADDR and L1SHeadADDR may be used to know whether a current status of the queue 507 is an empty queue. This operation may be expressed by the following pseudo code.

```
U32 L0_IsSCQEmpty( )
{
if (L0TailADDR == L1SHeaderADDR)
return TRUE;
else
return FALSE;
}
```

Figure 6:
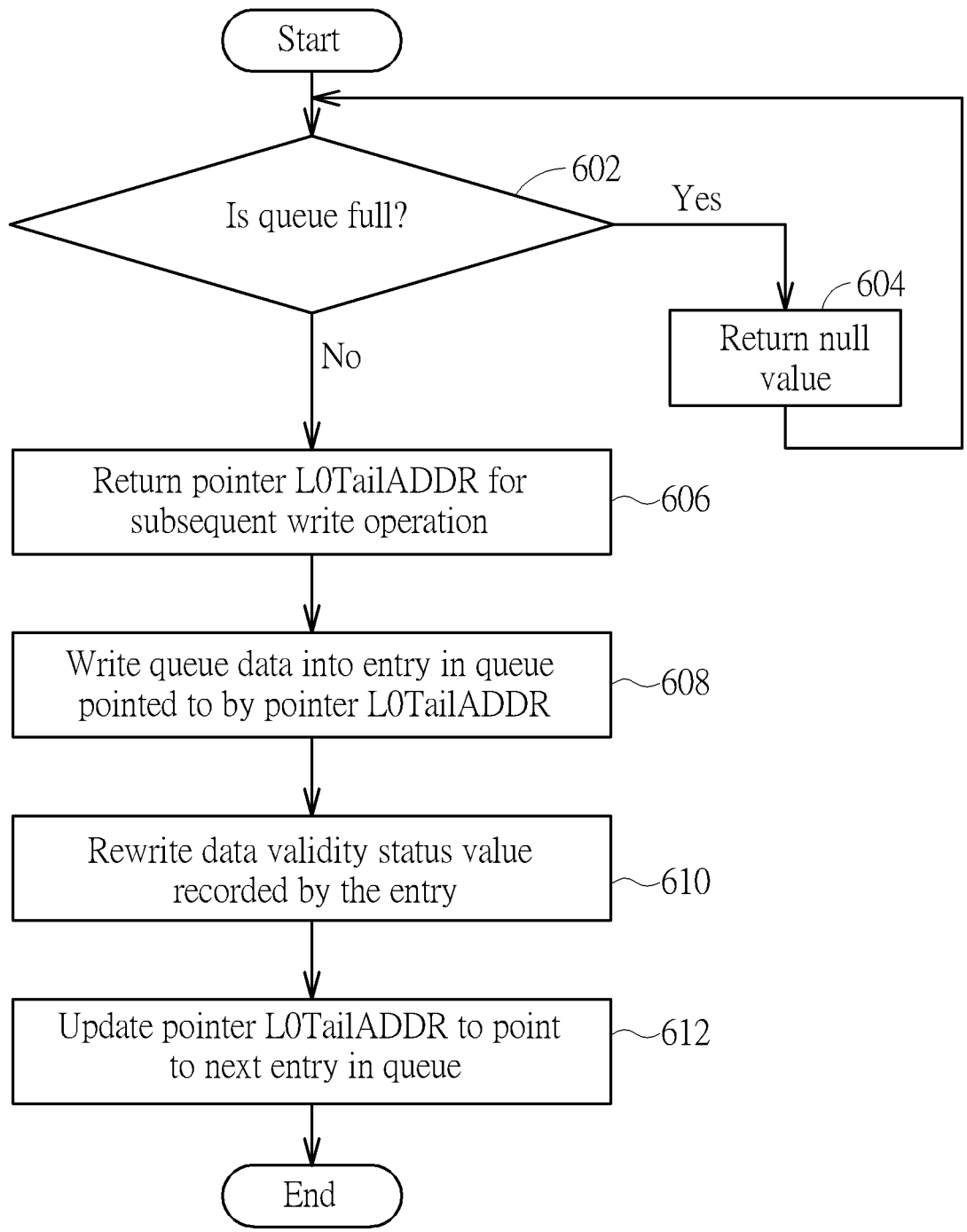
FIG. 6 is a flow chart of writing data into an embedded memory by a processor shown in FIG. 5 according to an embodiment of the present invention.

In addition, when the processor 502 executes the program code PROG_0, the two pointers L0TailADDR and L1SHeadADDR may be further used to control the write operation, to write the queue data (e.g. command) SQ_Entry' into the queue 507 stored in the embedded memory 506. FIG. 6 is a flow chart of writing data into an embedded memory by a processor shown in FIG. 5 according to an embodiment of the present invention. Provided that the result is substantially the same, the steps are not required to be executed in the exact order shown in FIG. 6. In addition, other steps may be added to the flow shown in FIG. 6. The flow shown in FIG. 6 may be realized by executing the program code PROG_0 by the processor 502. In Step 602, the processor 502 determines whether a next entry (L0TailADDR+1) following an entry in the queue 507 that is pointed to by the pointer L0YailADDR is an entry in the queue 507 that is pointed to by another pointer L1SHeadADDR, to generate a determination result, and refers to the determination result to determine whether to return the pointer L0TailADDR for the subsequent write operation. It is assumed that the queue 507 is realized by data structure of the circular queue, and the number of entries included in the queue 507 is SCmdQDepth (SCmdQDepth=8 in this embodiment). As a result, L0TailADDR+1 is first processed by a modulus operation according to SCmdQDepth, to determine a correct pointer value of the next entry, and then the obtained correct pointer value of the next entry is used to determine whether the next entry following the entry in the queue (circular queue) 507 pointed to by the pointer L0TailADDR is the entry in the queue (circular queue) 507 pointed to by another pointer L1SHeadADDR. If the next entry following the entry in the queue 507 pointed to by the pointer L0TailADDR is the entry in the queue 507 pointed to by another pointer L1SHeadADDR, it represents that the queue 507 is full, and the write operation cannot be executed currently. As a result, a null value is returned (Step 604), and Step 602 is repeated to wait for the queue 507 to have available space. If the next entry following the entry in the queue 507 pointed to by the pointer L0TailADDR is not the entry in the queue 507 pointed to by another pointer L1SHeadADDR, it represents that the queue 507 still has available space. As a result, the pointer L0TailADDR is returned for the subsequent write operation (Step 606).

The above-mentioned operation may be expressed by the following pseudo code.
PSCMD

```
L0_GetNewSCmdNode( )
{
if ( (L0TailADDR+1) % SCmdQDepth == L1SHeadADDR)
return NULL;
else
return L0TailADDR;
}
```

In Step 608, the processor 502 writes the queue data SQ_Entry' into the entry in the queue 507 pointed to by the pointer L0TailADDR. After the queue data SQ_Entry' is written into the entry in the queue 507 pointed to by the pointer L0TailADDR, in Step 610, the processor 502 rewrites the data validity status value recorded by this entry from 00h (e.g. STS=STS_FREE=00h) to 01h (i.e. STS=STS_PENDING=01h). In addition, in Step 612, the processor 502 updates the pointer L0TailADDR to point to the next entry (L0TailADDR=L0TailADDR+1) in the queue 507. As mentioned before, it is assumed that the queue 507 is realized by data structure of the circular queue, and the number of entries included in the queue 507 is SCmdQDepth (SCmdQDepth=8 in this embodiment). As a result, L0TailADDR=L0TailADDR+1 is processed by the modulus operation to determine the updated value of the pointer L0TailADDR according to SCmdQDepth.

The above-mentioned operation may be expressed by the following pseudo code.

```
void    Lo_PushSCmdNode( )
{
L0TailADDR->SCmdStatus = STS_PENDING;
L0TailADDR = (L0TailADDR+1) % SCmdQDepth;
}
```

Figure 7:
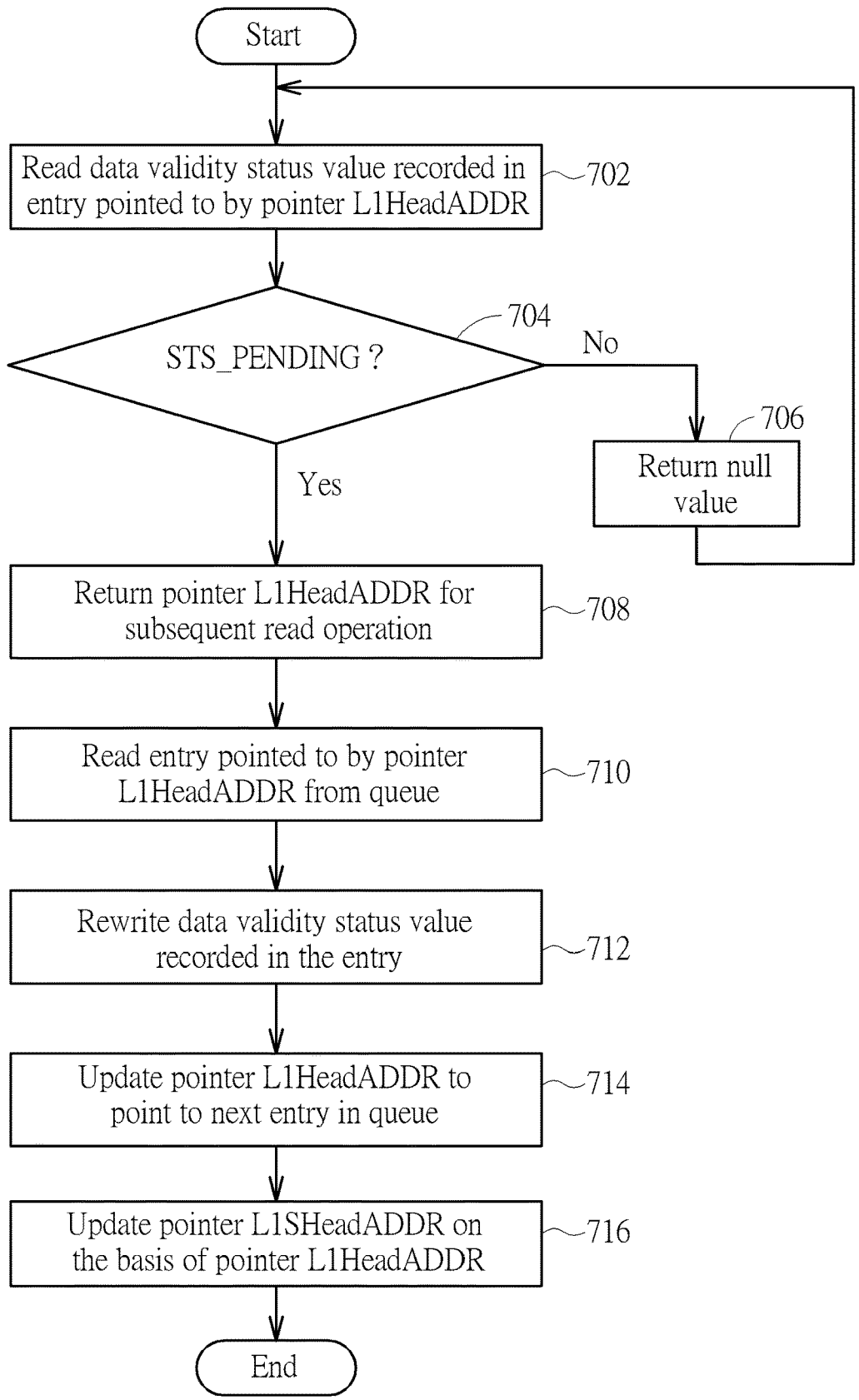
FIG. 7 is a flow chart of reading data from an embedded memory by another processor shown in FIG. 5 according to an embodiment of the present invention.

As shown in FIG. 5, there is the pointer L1HeadADDR inside another processor 504. As a result, when the processor 504 executes the program code PROG_1, the pointer L1HeadADDR may be used to control the read operation, to read each entry of the queue 507 stored in the embedded memory 506. FIG. 7 is a flow chart of reading data from an embedded memory by another processor shown in FIG. 5 according to an embodiment of the present invention. Provided that the result is substantially the same, the steps are not required to be executed in the exact order shown in FIG. 7. In addition, other steps may be added to the flow shown in FIG. 7. The flow shown in FIG. 7 may be realized by executing the program code PROG_1 by the processor 504.

In Step 702, the processor 504 reads the data validity status value STS recorded in the entry pointed to by the pointer L1HeadADDR. In Step 704, the processor 504 determines whether to return the pointer L1HeadADDR for the subsequent read operation according to the data validity status value STS. For example, the processor 504 determines whether the data validity status value STS is 01h (STS_PENDING). If the data validity status value is 00h (STS_FREE), it represents that the queue 507 currently is an empty queue. As a result, Step 706 is entered to return a null value, and Steps 702 and 704 are repeated to wait for the processor 502 to write the queue data SQ_Entry' into the queue 507. On the contrary, if the data validity status value STS is 01h (STS_PENDING), is represents that the queue 507 currently has the entry to be processed. As a result, Step 708 is entered to return the pointer L1HeadADDR for the subsequent read operation.

The above-mentioned operation may be expressed by the following pseudo code.

```
PSCMD    HAL_L1GetSCmd( )
{
If (L1HeadADDR->SCmdStatus == STS_PENDING)
return L1HeadADDR;
else
return NULL;
}
```

In Step 710, the processor 504 refers to the pointer L1HeadADDR returned by Step 708 to read the entry pointed to by the pointer L1HeadADDR from the queue 507, and obtains the queue data (e.g. command) recorded in this entry. Since the entry pointed to by the pointer L1HeadADDR has been read, in Step 712, the processor 504 rewrites the data validity status value recorded in this entry as 00h (STS_FREE). In addition, in Step 714, the processor 504 updates the pointer L1HeadADDR to point to the next entry (L1HeadADDR=L1HeadADDR+1) in the queue 507. It is assumed that the queue 507 is realized by data structure of the circular queue, and the number of entries included in the queue 507 is SCmdQDepth (SCmdQDepth=8 in this embodiment). As a result, L1HeadADDR+1 is processed by the modulus operation to determine the updated value of the pointer L1HeadADDR according to SCmdQDepth. As mentioned before, in order to prevent the processor 502 from reading the pointer L1HeadADDR from the processor 504 that consumes a lot of clock cycles, the processor 504 duplicates and writes the pointer L1HeadADDR into the processor 502. As a result, in Step 716, the processor 504 updates the pointer L1SHeadADDR in the processor 502 on the basis of the pointer L1HeadADDR obtained by Step 714.

The above-mentioned operation may be expressed by the following pseudo code.

```
void    L1_PopSCmdNode( )
{
L1HeadADDR->SCmdStatus = STS_FREE;
L1HeadADDR = (L1HeadADDR +1) % SCmdQDepth;
L1SHeadADDR = L1HeadADDR;
}
```

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A computer system, comprising:
a processor, comprising an embedded memory; and
a processing circuit, arranged to perform a write operation for writing a first write data into the embedded memory included in the processor;
wherein the processor is arranged to load and execute a program code, to perform a read operation for reading the first write data from the embedded memory included in the processor;
wherein the embedded memory has a storage space addressed by a memory address; the processing circuit writes the first write data into the storage space; and before notifying the processing circuit of writing the first write data into the embedded memory, the processor executes the program code to write an invalid code into the storage space;
wherein after notifying the processing circuit of writing the first write data into the embedded memory, the processor executes the program code to read a read data from the memory address, and compares the read data with the invalid code to generate a comparison result; in response to the comparison result indicating that the read data is different from the invalid code, the processor executes the program code to write the invalid code into the memory address again, and writes the read data back to a register comprised in the processing circuit, in order to notify the processing circuit via the register that a next data can be written into the embedded memory; and in response to the comparison result indicating that the read data is not different from the invalid code, the processor executes the program code to wait for the processing circuit to write the first write data into the embedded memory, and executes the program code to process other tasks.

2. The computer system of claim 1, wherein the processing circuit is a pure hardware circuit.

3. The computer system of claim 2, wherein the processor executes the program code to write a second write data into the register, to notify the processing circuit of writing the first write data into the embedded memory.

4. The computer system of claim 1, wherein after notifying the processing circuit of writing the first write data into the embedded memory, the processor is further arranged to determine whether to return the read data as an output of the read operation according to the comparison result; and in response to the comparison result indicating that the read data is different from the invalid code, the processor executes the program code to return the read data as the output of the read operation.

* * * * *